US006653418B1

(12) United States Patent
Maruyama et al.

(10) Patent No.: US 6,653,418 B1
(45) Date of Patent: Nov. 25, 2003

(54) PROCESS FOR PREPARING POLYMER COMPOUND FOR RESIST

(75) Inventors: Katsuhiro Maruyama, Takasaki (JP); Satoru Yoshida, Takasaki (JP); Satoru Kitano, Takasaki (JP); Hitoshi Mashio, Takasaki (JP)

(73) Assignee: Gun EI Chemical Industry Co., Ltd. (JP)

( * ) Notice: Subject to any disclaimer, the term of this patent is extended or adjusted under 35 U.S.C. 154(b) by 0 days.

(21) Appl. No.: 10/219,262

(22) Filed: Aug. 16, 2002

(51) Int. Cl.⁷ .............. C08F 4/04; C08F 8/12
(52) U.S. Cl. .............. 526/219; 526/266; 526/282; 526/326; 525/329.5; 525/374
(58) Field of Search .............. 525/329.5, 374; 526/219, 326, 266, 282

(56) References Cited

U.S. PATENT DOCUMENTS

| 4,689,371 A | | 8/1987 | Elmore et al. | |
| 5,239,015 A | * | 8/1993 | Sheehan et al. | 525/344 |
| 6,258,901 B1 | * | 7/2001 | Kaneko et al. | 526/77 |

FOREIGN PATENT DOCUMENTS

| EP | 0277 721 A1 | 8/1988 |
| EP | 0 466 359 A2 | 1/1992 |
| JP | 07-96569 B | 10/1995 |
| JP | 3022932 | 3/2000 |

* cited by examiner

Primary Examiner—Fred Teskin
(74) Attorney, Agent, or Firm—Burns, Doane, Swecker & Mathis, LLP

(57) ABSTRACT

There is provided a process for preparing a polymer compound for a resist, which can improve the performance, such as the heat resistance, sensitivity and resolution of the resist, without causing film loss of the resist, line width reduction of the resist or deterioration of the dry etching resistance of the polymer. This process comprises dissolving a styrene-based monomer containing at least a 4-acetoxystyrene monomer, and a dimethyl-2,2'-azobiscarboxylate ester in a solvent, thereby to polymerize the styrene-based monomer; adding an alkali catalyst to the resulting polymer solution, thereby to hydrolyze the polymer solution; and washing the resulting polymer compound with water.

6 Claims, No Drawings

PROCESS FOR PREPARING POLYMER COMPOUND FOR RESIST

BACKGROUND OF THE INVENTION

1. Field of the Invention

The present invention relates to a process for preparing a polymer compound for a resist and, more particularly, to a process for preparing a polymer compound for a resist which is useful as a photosensitive resin such as a resist, or as a precursor used to obtain the photosensitive resin.

2. Description of the Related Art

A homopolymer or copolymer of 4-hydroxystyrene is known as a photosensitive resin such as a resist, or a precursor used to obtain the photosensitive resin.

As the process for preparing such a polymer, for example, there has been known a process for preparing a vinylphenol polymer, which comprises reacting a polymer of 4-acetoxystyrene dissolved in methanol with a quaternary ammonium base at a temperature within a range from about 40° C. to about 80° C. over sufficient time to cause hydrolysis of an acetoxy group to form a phenol group, and heating to a temperature within a range from about 50° C. to about 150° C., thereby to distill off the methyl acetate produced during the reaction and a decomposition product of a quaternary ammonium hydroxide, as disclosed in Japanese Examined Patent Application, Second Publication No. Hei 7-96569 B.

Control of the composition ratio and the molecular weight of the polymer, and reducing the amount of solution residue in alkali solutions have hitherto been carried out to improve the performance such as the heat resistance, sensitivity and resolution of the resist. Particularly, modification of the polymer with a specific compound has hitherto been conducted to improve the resolution.

However, control of the polymer composition ratio and hydrophilization of the polymer by modifying the same gave rise to problems such as film loss of the resist and line width reduction of the resist. Also reduction of the molecular weight of the polymer improves the solubility in alkali solutions, but causes problems such as deterioration of the dry etching resistance of the polymer.

According to the technique disclosed in the above Japanese Examined Patent Application, Second Publication No. Hei 7-96569 B, it is possible to remove residual alkali metals which give rise to problems, by utilization of a 4-hydroxystyrene polymer. However, it was difficult to improve the performance such as the heat resistance, sensitivity and resolution of the resist without causing film loss of the resist, line width reduction of the resist and deterioration of the dry etching resistance of the polymer.

BRIEF SUMMARY OF THE INVENTION

An object of the present invention is to provide a process for preparing a polymer compound for a resist which can improve the performance, such as the heat resistance, sensitivity and resolution of the resist, without causing film loss of the resist, line width reduction of the resist or deterioration of the dry etching resistance of the polymer.

The present inventors have carried out intensive studies to achieve the object described above and found that the problems described above can be solved by adding an alkali catalyst to a solution of a polymer prepared from as at least one of the constituent monomers, a 4-acetoxystyrene-based monomer obtained by using a dimethyl-2,2'-azobiscarboxylate ester as a polymerization initiator, thereby to hydrolyze the polymer solution, and washing the resulting polymer compound with water. Thus, the present invention has been completed.

The present invention provides a process for preparing a polymer compound for a resist, which comprises dissolving a styrene-based monomer containing at least a 4-ace toxy-styrene monomer, and a dimethyl-2,2'-azobiscarboxylate ester in a solvent, thereby to polymerize the styrene-based monomer; adding an alkali catalyst to the resulting polymer solution, thereby to hydrolyze the polymer; and washing the resulting polymer compound with water.

Such a constitution makes it possible to obtain a polymer compound for resist which can improve the performance, such as the heat resistance, sensitivity and resolution of the resist, without causing film loss of the resist, line width reduction of the resist or deterioration of the dry etching resistance of the polymer.

DETAILED DESCRIPTION OF THE INVENTION

The styrene-based monomer used in the present invention contains at least a 4-acetdxystyrene monomer. The styrene-based monomer is preferably a compound represented by the following formula (1):

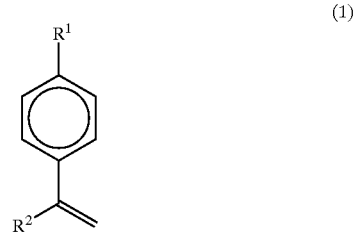

$R^1$ represents a hydrogen atom, a hydroxyl group, an alkyl group having 1 to 6 carbon atoms, an alkoxy group having 1 to 6 carbon atoms, or an acyloxy group having 2 to 7 carbon atoms, and $R^2$ represents a hydrogen atom or a methyl group. The alkyl group having 1 to 6 carbon atoms, the alkoxy group having 1 to 6 carbon atoms and the acyloxy group having 2 to 7 carbon atoms may be straight or branched. $R^1$ is more preferably a hydroxyl group, an alkoxy group having 3 to 5 carbon atoms, or an acyloxy group having 2 to 4. carbon atoms, and particularly preferably a hydroxyl group, a t-butoxy group, or an acetoxy group. In the present invention, a 4-acetoxystyrene monomer and, if necessary, one or more kinds of the styrene-based monomers described above can be used.

A dimethyl-2,2'-azobiscarboxylate ester is used as a polymerization initiator for polymerizing the styrene-based monomer. A carboxylic acid residue, which constitutes the di methyl-2,2'-azobiscarboxylate ester, may be straight or branched, and preferably has 2 to 8 carbon atoms, and more preferably 2 to 5 carbon atoms. A 2-methylpropoxy group is particularly preferred. The use of the dimethyl-2,2'-azobiscarboxylate ester as the polymerization initiator makes it possible to obtain a polymer compound for resist which can improve the performance, such as the heat resistance, sensitivity and resolution of the resist without causing film loss of the resist, line width reduction of the resist or deterioration of the dry etching resistance of the polymer. When using 2,2'-azobisisobutyronitrile as the polymerization initiator, the excellent effects described above cannot be obtained to a sufficient extent.

According to the process of the present invention, first, a styrene-based monomer containing at least a 4-acetoxystyrene monomer, and a dimethyl-2,2'-azobiscarboxylate ester are dissolved in an solvent, thereby to polymerize the styrene-based monomer to prepare a polymer containing the styrene-based monomer as a constituent monomer.

The solvent, which dissolves the styrene-based monomer and the dimethyl-2,2'-azobiscarboxylate ester, thereby to polymerize the styrene-based monomer, is not specifically limited as far as it can dissolve them, and a general solvent can be used, but the solvent preferably contains no methanol. Specific examples thereof include ethylene glycol monoethyl ether and propylene glycol monomethyl ether acetate.

The polymerization can be conducted, for example, by a solution polymerization, suspension polymerization, emulsion polymerization or block polymerization process using a publicly known free radical catalyst such as a peroxide or an azo compound.

The mixing ratio (molar ratio) of the styrene-based monomer to the dimethyl-2,2'-azobiscarboxylate ester is preferably within a range from 100:1 to 100:30, and particularly preferably from 100:2 to 100:20. With respect to the reaction conditions, the reaction temperature is preferably within a range from 1 to 150° C., and particularly preferably from room temperature (25° C.) to 100° C., while the reaction time is preferably within a range from 1 to 48 hours, and particularly preferably from 3 to 24 hours. The atmosphere in the reaction vessel is preferably replaced by nitrogen to prevent the deactivation of radicals.

By appropriately selecting these reaction conditions, a polymer having a molecular weight suited for use can be prepared.

Then, the resulting polymer is hydrolyzed by adding an alkali catalyst to prepare a hydroxystyrene polymer. The alkali catalyst is preferably a quaternary amine hydroxide. The quaternary amine hydroxide is represented by the following formula.

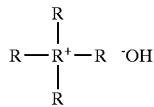

In the formula, each R is an organic group having 1 to 9 carbon atoms. R may be aliphatic or aromatic and may be the same or different. The organic group also includes hydroxyethyl. Examples of the organic group include methyl, ethyl, isopropyl, butylbenzyl, methylbenzyl, and dimethylbenzyl. Examples of useful quaternary ammonium hydroxide include tetramethylammonium hydroxide, ethyltrimethylammonium hydroxide, diethyldimethylammonium hydroxide, triethylmethylammonium hydroxide, tetraethylammonium hydroxide, benzyltrimethylammonium hydroxide, and choline. Aparticularly preferred quaternary ammonium hydroxide is tetramethylammonium hydroxide.

The amount of the alkali catalyst to be added is preferably within a range from 1 to 20% by weight, and particularly preferably from 1 to 5% by weight, based on the amount of the styrene-based monomer. With respect to the hydrolysis conditions, the hydrolysis temperature is preferably within a range from 20° C. to 100° C., and particularly preferably from 20° C. to 80° C., and the hydrolysis time is preferably within a range from 1 to 10hours, and particularly preferably from 3 to 8 hours.

The resulting hydroxystyrene polymer-containing solution is then washed with water. Washing with water makes it possible to obtain a polymer compound for resist which can improve the performance, such as the heat resistance, sensitivity and resolution of the resist, without causing film loss of the resist, line width reduction of the resist or deterioration of the dry etching resistance of the polymer. Because they are not stable to heating, quaternary ammonium hydroxides have the merit that they decompose into a low-boiling decomposition product after the hydrolysis reaction, resulting in easy removal from the reaction solution. However, it is difficult to completely remove quaternary ammonium hydroxides only by decomposition with heating. Therefore, when using decomposition with heating in place of washing with water in order to remove the quaternary ammonium hydrides, the excellent effects described above cannot be obtained to a sufficient extent. Washing can be conducted by adding an arbitrary amount of water an arbitrary number of times. The temperature for the addition is not specifically limited. Water may be mixed with methanol in an appropriate ratio.

A polymer compound for a resist can be obtained by purifying and drying the solution using a conventional process after washing with water.

Similarly to the homopolymerization of styrene, 4-acetoxystyrene can be easily homopolymerized, or copolymerized with styrene or another monomer capable of copolymerizing with styrene.

In the present invention, a compound other than the styrene-based monomer can be copolymerized together with the styrene-based monomer. Examples of such a compound include vinyltoluene, a-ethylstyrene, a diene monomer such as butadiene; acrylate such as methyl acrylate, methyl methacrylate, ethyl acrylate, butyl acrylate, butyl methacrylate, or 2-ethylhexyl acrylate; and polymerizable acid such as methacrylate ester monomer, acrylic acid, methacrylic acid, maleic anhydride, maleic acid, or fumaric acid. The compound is preferably a compound represented by the following formula (2):

wherein $R^3$ represents a hydrogen atom or a methyl group, and $R^4$ represents an alkyl group having 1 to 6 carbon atoms, or any one of the following formulas (3) to (7):

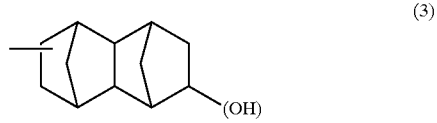

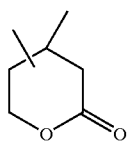

(6)

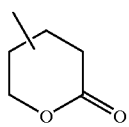

(7)

The effect of improving the resolution is exerted by polymerizing the compound represented by the formula (2) as a monomer. The mixing ratio of the styrene-based monomer to the compound represented by the formula (2) is not specifically limited.

The polymer compound for a resist prepared by the process of the present invention is useful as a resin for a resist used in the formation of resist patterns. The resist pattern can be formed, for example, by preparing a resin solution containing the polymer compound for a resist, a photo acid generator and a solvent (for example, ethyl lactate), applying the resist solution onto a substrate to form a resist film, exposing the resist film to light and developing the exposed resist film.

The following Examples further illustrate the present invention, but the present invention is not limited thereto.

EXAMPLE 1
(Preparation of 4-Hydroxystyrene/4-tert-butoxystyrene Polymer Using Dimethyl-2,2'-azobis(2-methylpropionate) as Polymerization Initiator)

In a separable flask, 100 g of ethylene glycol monoethyl ether, 78.6 g of 4-acetoxystyrene, 21.4 g of 4-tert-butoxystyrene, and 3.7 g of dimethyl-2,2'-azobis(2-methylpropionate) as a polymerization initiator were charged and, after replacing the atmosphere in the separable flask with nitrogen, the reaction was conducted at 80° C. for 16 hours. To this reaction solution, 5 g of 25% tetramethylammonium hydroxide was added, followed by heating at 70° C. for 5 hours. To remove low-molecular weight oligomers and residual monomers, this solution was washed several times with methanol/deionized water mixed in arbitrary rate. After washing, the solvent in the solution was replaced with propylene glycol monomethyl ether acetate to obtain 400 g of a propylene glycol monomethyl ether acetate solution (solid content: 20%) of a 4-hydroxystyrene/4-tert-butoxystyrene polymer.

The resulting polymer had a molecular weight of 30000.

EXAMPLE 2
(Preparation of Substituted 4-Hydroxystyrene/4-tert-butoxystyrene Polymer Using Dimethyl-2,2'-azobis(2-methylpropionate) as Polymerization Initiator)

To 100 g of the propylene glycol monomethyl ether acetate solution of a 4-hydroxystyrene/4-tert-butoxystyrene polymer obtained in Example 1, 1.1 g of ethyl vinyl ether and 0.17 g of trifluoroacetic acid were added after replacing the atmosphere with nitrogen, and the reaction was conducted at room temperature for 5 hours. The resulting reaction solution was neutralized by adding 0.3 g of triethylamine. After neutralization, the reaction solution was washed by adding deionized water. This washing process was repeated several times. After washing, the solution was dehydrated under a vacuum and the solvent in the solution was replaced with ethyl lactate to obtain 100 g of an ethyl lactate solution of a substituted 4-hydroxystyrene/4-tert-butoxystyrene polymer.

Comparative Examples 1 and 2

In Comparative Example 1, 400 g of a propylene glycol monomethyl ether acetate solution of a 4-hydroxystyrene/4-tert-butoxystyrene polymer was obtained in the same manner as in Example 1, except that 2,2'-azobisisobutyronitrile was used in place of dimethyl-2,2'-azobis(2-methylpropionate) in Example 1. The resulting polymer had a molecular weight of 30000.

In Comparative Example 2, 100 g of an ethyl lactate solution of a substituted 4-hydroxystyrene/4-tert-butoxystyrene polymer was obtained in the same manner as in Example 2, except that 2,2'-azobisisobutyronitrile was used in place of dimethyl-2,2'-azobis(2-methylpropionate) in Example 2.

Test Example 1
(Formation of Resist Pattern)

In 100 g of the ethyl lactate solutions of the substituted 4-hydroxystyrene/4-tert-butoxystyrenepolymer obtained in Example 2 and Comparative Example 2, 5 g of bis(cyclohexylsulfonyl)diazomethane as a photo acid generator was dissolved to prepare a solution. This solution was filtered by passing through a 0.1 $\mu$m membrane filter to prepare a resist solution. This resist solution was applied onto a silicon wafer using a spinner, and dried on a hot plate at 90° C. for 90 minutes to form a resist film having a film thickness of 0.5 $\mu$m. This film was exposed to light using a stepper, heated to 110° C. for 90 seconds, developed with an aqueous 2.38% tetramethylammonium hydroxide solution for 30 seconds, and then rinsed with deionized water.

With respect to the resist pattern after development, the profile of the pattern, the resolution, the sensitivity, the dissolution residue and the heat resistance were evaluated by the following procedures. The results are shown in Table 1.

(Profile of the Pattern)

Silicon wafers with the resist pattern after development were allowed to stand in clean ovens set to various temperatures for 30 seconds, and then the profile of the resist pattern was observed by a scanning electron microscope.

(Resolution)

Provided that the exposure dose for which the top and bottom of a 0.25 $\mu$m line-and-space pattern were resolved at 1:1 was taken as the optimum exposure dose, the minimum line width of a line-and-space pattern which was recognized as separate at this exposure dose was taken as the resolution of a test resist.

(Sensitivity)

The exposure dose for which the top and bottom of a 0.25 $\mu$m line-and-space pattern were resolved at 1:1 was taken as the optimum exposure dose.

(Dissolution Residue)

The presence or absence of a dissolution residue was judged by SEM (scanning electron microscope) micrographs.

(Heat Resistance)

The heat resistance was indicated by the temperature at which the resist pattern was thermally deformed.

TABLE 1

|  | Example 1 | Comparative Example 2 |
|---|---|---|
| Profile of pattern | 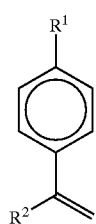 ○ | 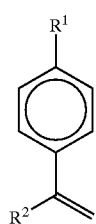 △ |
| Resolution (μm) | 0.13 | 0.18 |
| Sensitivity (mJ/cm$^2$) | 35 | 40 |
| Dissolution residue | not observed | observed |
| Heat resistance (° C.) | 135 | 130 |

As is apparent from Table 1, performance such as the heat resistance, sensitivity and resolution of the resist can be improved by using the polymer compound for the resist prepared by the process of the present invention.

According to the process of the present invention, it is made possible to obtain a polymer compound for a resist which can improve the performance, such as the heat resistance, sensitivity and resolution of the resist, without causing film loss of the resist, line width reduction of the resist or deterioration of the dry etching resistance of the polymer.

What is claimed is:

1. A process for preparing a polymer compound for a resist, which comprises dissolving a styrene-based monomer containing at least a 4-acetoxystyrene monomer, and a dimethyl-2,2'-azobiscarboxylate ester in a solvent, thereby to polymerize the styrene-based monomer; adding an alkali catalyst to the resulting polymer solution, thereby to hydrolyze the polymer; and washing the resulting polymer compound with water.

2. The process for preparing a polymer compound for a resist according to claim 1, wherein the dimethyl-2,2'-azobiscarboxylate ester is dimethyl-2,2'-azobis(2-methylpropionate).

3. The process for preparing a polymer compound for a resist according to claim 1, wherein the styrene-based monomer is represented by the following formula (1):

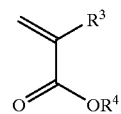

(1)

wherein $R^1$ represents a hydrogen atom, a hydroxyl group, an alkyl group having 1 to 6 carbonic atoms, an alkoxy group having 1 to 6 carbon atoms, or an acyloxy group having 2 to 7 carbon atoms, and $R^2$ represents a hydrogen atom or a methyl group.

4. The process for preparing a polymer compound for a resist according to claim 1, wherein the solvent does not contain methanol.

5. The process for preparing a polymer compound for a resist according to claim 1, wherein the alkali catalyst is a quaternary amine hydroxide.

6. The process for preparing a polymer compound for a resist according to claim 1, wherein a compound represented by the following formula (2):

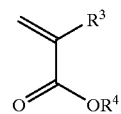

(2)

wherein $R^3$ represents a hydrogen atom or a methyl group, and $R^4$ represents an alkyl group having 1 to 6 carbon atoms, or any one of the following formulas (3) to (7):

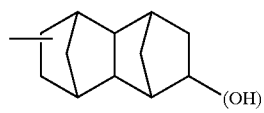

(3)

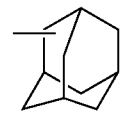

(4)

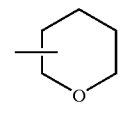

(5)

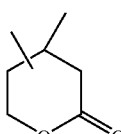

(6)

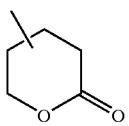

(7)

is copolymerized together with a styrene-based monomer.

* * * * *